US00RE50149E

(19) United States
(12) Reissued Patent
May

(10) Patent Number: US RE50,149 E
(45) Date of Reissued Patent: Sep. 24, 2024

(54) FREE BUSY CALENDAR INTERFACE

(71) Applicant: MALIKIE INNOVATIONS LIMITED, Dublin (IE)

(72) Inventor: Darrell May, Waterloo (CA)

(73) Assignee: Malikie Innovations Limited, Dublin (IE)

(21) Appl. No.: 14/298,699

(22) Filed: Jun. 6, 2014

Related U.S. Patent Documents

Reissue of:
(64) Patent No.: 8,208,907
Issued: Jun. 26, 2012
Appl. No.: 12/903,689
Filed: Oct. 13, 2010

U.S. Applications:
(63) Continuation of application No. 12/536,808, filed on Aug. 6, 2009, now Pat. No. 7,840,210, which is a continuation of application No. 11/278,489, filed on Apr. 3, 2006, now Pat. No. 7,590,413.

(51) Int. Cl.
*H04M 1/72451* (2021.01)
*H04M 1/72436* (2021.01)

(52) U.S. Cl.
CPC .... *H04M 1/72451* (2021.01); *H04M 1/72436* (2021.01)

(58) Field of Classification Search
CPC ..... H04L 29/08108; H04M 2201/18; H04M 1/72451; H04M 1/72436; H04W 4/02
USPC ..... 455/414.1, 436, 440; 370/259, 338
See application file for complete search history.

(56) References Cited

U.S. PATENT DOCUMENTS 6,085,166 A * 7/2000 Beckhardt ..... G06Q 10/109 705/7.18
6,097,964 A 8/2000 Nuovo et al.
6,466,236 B1 * 10/2002 Pivowar ..... G06F 15/0266 715/835
6,757,530 B2 6/2004 Rouse et al.
6,941,160 B2 9/2005 Otsuka et al.
7,035,913 B2 * 4/2006 Culp ..... G06Q 10/109 709/217
7,069,003 B2 6/2006 Lehikoinen et al.
7,181,689 B2 * 2/2007 Mock ..... G06Q 10/109 715/703
7,346,705 B2 * 3/2008 Hullot ..... G06Q 10/107 709/238
7,610,390 B2 * 10/2009 Yared ..... H04L 63/102 709/227
7,853,563 B2 * 12/2010 Alvarado ..... G06Q 10/109 707/616

(Continued)

OTHER PUBLICATIONS

Harry Newton, Newton's Telecom Dictionary, Feb. 2002, CMP Books, 18th Ed., p. 333.*

*Primary Examiner* — Roland G Foster

(74) *Attorney, Agent, or Firm* — Botos Churchill IP Law LLP

(57) ABSTRACT

A method and electronic device which provide a calendar having availability status options based on a type of remote server are described. In accordance with one embodiment, there is provided a method comprising: determining, by an electronic device, a type of a remote server in communication with the electronic device; and setting, by the electronic device, availability status options for an availability status field for calendar events based on the type of the remote server.

25 Claims, 5 Drawing Sheets

(56) References Cited

U.S. PATENT DOCUMENTS

| | | | | |
|---|---|---|---|---|
| 8,069,166 | B2 * | 11/2011 | Alvarado | G06Q 10/109 707/722 |
| 8,719,842 | B2 * | 5/2014 | Bhogal | G06F 9/546 709/206 |
| 9,042,869 | B2 * | 5/2015 | Bulgin | H04M 1/6505 370/259 |
| 2006/0200374 | A1 * | 9/2006 | Nelken | 705/9 |
| 2006/0285661 | A1 * | 12/2006 | Patel et al. | 379/88.16 |
| 2007/0130221 | A1 * | 6/2007 | Abdo | G06F 21/6227 |
| 2007/0143003 | A1 | 6/2007 | Chien | |
| 2007/0143684 | A1 | 6/2007 | Stillion et al. | |
| 2009/0247134 | A1 * | 10/2009 | Jeide | H04L 67/2842 455/414.2 |

* cited by examiner

FREE BUSY CALENDAR INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION DATA

This application is a continuation of U.S. patent application Ser. No. 12/536,808, which is a continuation of U.S. patent application Ser. No. 11/278,489, filed April 3, 2006, now U.S. Pat. No. 7,590,413. The content of the above-noted documents is incorporated herein by reference.

TECHNICAL FIELD

The present application relates to mobile device entry of event details and, in particular, to mobile device entry of availability status in relation to an event.

BACKGROUND

Communication devices, in particular handheld mobile communication devices, are becoming increasingly sophisticated. A common feature of such communication devices is a system or application for scheduling events such as, for example, a built-in calendar. If the system or application does not permit the device user to enter details for events in an intuitive manner, benefits realized through use of the system or application may be less than if it did permit details entry in such a manner.

Accordingly, it would be advantageous to improve mobile device entry of event details.

BRIEF DESCRIPTION OF THE DRAWINGS

Reference will now be made, by way of example, to the accompanying drawings which show example embodiments, and in which.

Similar or the same reference numerals may have been used in different figures to denote similar components.

DETAILED DESCRIPTION OF EXAMPLE EMBODIMENTS

Figure 1:
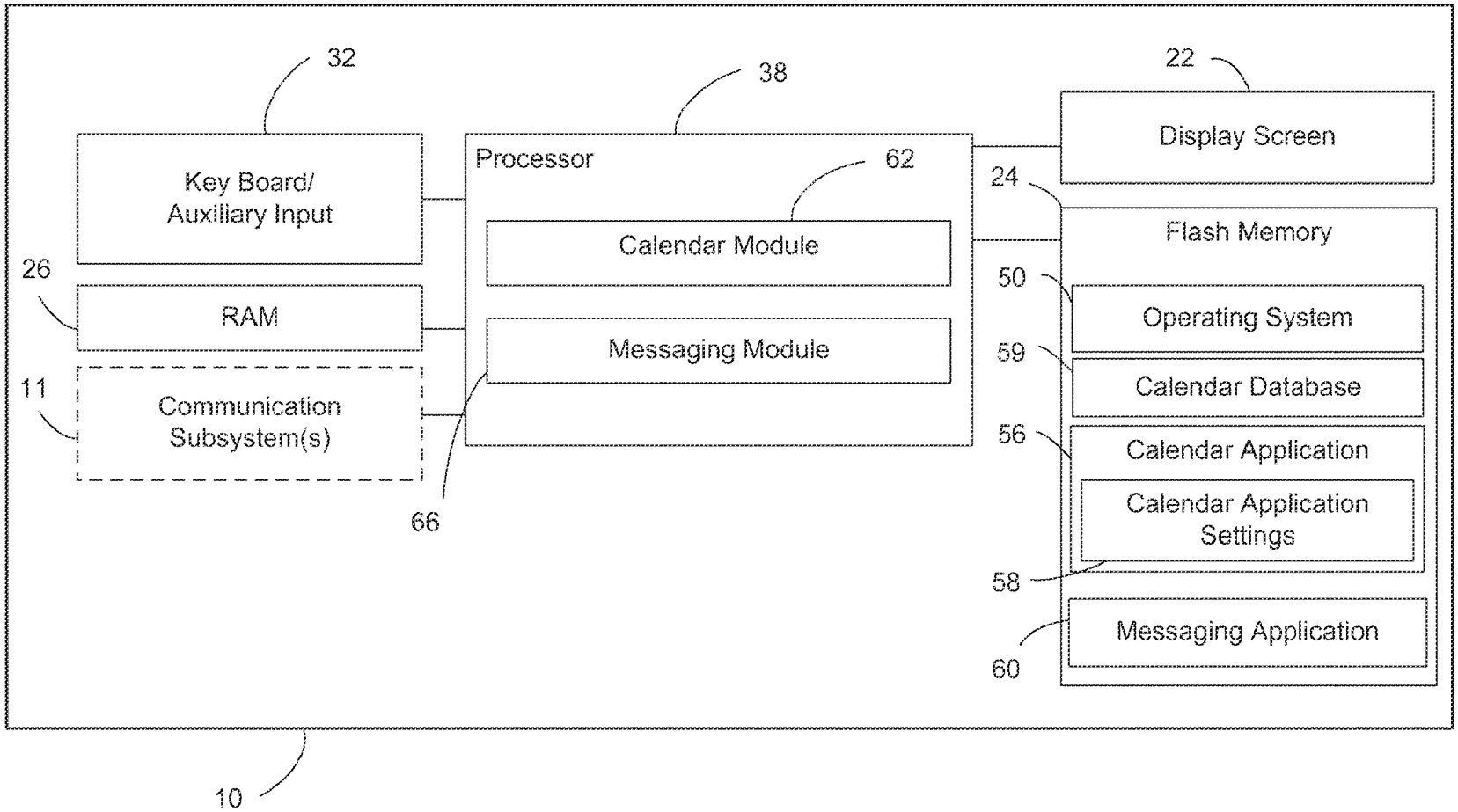
FIG. 1 shows a block diagram of an electronic mobile device to which example embodiments can be applied.

An electronic device having access to a calendar database comprising calendar event data identifying events scheduled for respective time slots and a method of using such a device are provided. The device is configured to generate on a display a calendar events detail user interface screen that includes a plurality of fields specifying information about an event scheduled to occur at a time slot, one of the fields being an availability status field displaying an availability status for the time slot, and in which the availability status options for the availability status field are dependent on a type of a remote messaging server.

In accordance with one embodiment of the present disclosure, there is provided a method comprising: determining, by an electronic device, a type of a remote server in communication with the electronic device; and setting, by the electronic device, availability status options for an availability status field for calendar events based on the type of the remote server.

In accordance with another embodiment of the present disclosure, there is provided an electronic device, comprising: a controller; a communication subsystem coupled to the controller which exchanges calendar event data with a remote server; the controller being configured to determine a type of the remote server, and set availability status options for an availability status field for calendar events based on the type of the remote server.

In accordance with a further embodiment of the present disclosure, there is provided a method comprising: determining, by an electronic device, a type of a remote server in communication with the electronic device; setting, by the electronic device, availability status options for an availability status field for calendar events based on the type of the remote server; displaying, by the electronic device, a calendar events detail user interface screen that includes a plurality of fields specifying information about an event, wherein one of the fields in the plurality of fields is an availability status field for displaying an availability status associated with the event; and setting, by the electronic device, the availability status in the displayed availability status field to one of the availability status options in response to input received by the electronic device.

In accordance with yet a further embodiment of the present disclosure, there is provided an electronic device, comprising: a controller; a display connected to the controller; a user input device connected to the controller; a communication subsystem connected to the controller which exchanges calendar event data with a remote server; the controller being configured to interact with a calendar database comprising calendar event data identifying events scheduled for respective time slots; the controller being further configured to generate on the display a calendar events detail user interface screen that includes a plurality of fields specifying information about an event scheduled to occur at a time slot, one of the fields being an availability status field displaying an availability status for the time slot, wherein availability status options for the availability status field are dependent on a type of the remote server; the communication subsystem exchanging calendar event data for scheduled events with the remote server, the exchanged calendar event data including the availability status of scheduled events.

In accordance with yet a further embodiment of the present disclosure, there is provided a method of generating calendar information on an electronic device having access to a calendar database storing calendar event data identifying events scheduled for respective time slots, the electronic device including a controller and a display, user input device, and communication subsystem each connected to the controller, the communication subsystem exchanging calendar event data with a remote server, the method comprising: generating on the display a calendar events detail user interface screen that includes a plurality of fields specifying information about an event scheduled to occur at a time slot, one of the fields being an availability status field displaying an availability status for the time slot, wherein availability status options for the availability status field are dependent on a type of the remote server; and exchanging with the remote server calendar event data for scheduled events, the exchanged calendar event data including the availability status of the scheduled events.

In accordance with a further embodiment of the present disclosure, there is provided a method of configuring a calendar application on an electronic device having access to a calendar database storing calendar event data identifying events scheduled for respective time slots, the electronic device including a controller and a display, user input device, memory and communication subsystem each connected to the controller, the communication subsystem exchanging calendar event data with a remote server, the method comprising: provisioning the electronic device with calendar application settings for interacting with the remote server dependent on a type of the remote server, the calendar application settings including availability status options used for indicating an availability status for a time slot in the calendar application; and generating on the display a calendar events detail user interface screen that includes a plurality of fields specifying information about an event scheduled to occur at a time slot, one of the fields being an availability status field displaying the availability status for the time slot.

In accordance with yet a further embodiment of the present disclosure, there is provided a computer program product comprising a computer readable medium having stored thereon computer program instructions for implementing a method on a handheld electronic device for controlling its operation, the computer executable instructions comprising instructions for performing the method(s) set forth herein.

The present description of example embodiments does not limit implementation to any particular computer programming language or system architecture. Embodiments described in the specification are not limited to any particular operating system (OS), mobile device architecture, server architecture, or computer programming language.

Any references herein to "messages" are not intended to be limited to e-mail, but should be understood to include other types of electronic messages that one skilled in the art would understand to be possible in the context in which the term is used.

Referring now to the drawings, FIG. 1 is a block diagram of an electronic mobile device 10 to which example embodiments can be applied. The mobile device 10 includes a controller that includes at least one microprocessor 38 (and possibly more than one microprocessor) that controls the overall operation of the device. The microprocessor 38 interacts with device subsystems such as a display 22, flash memory 24, random access memory (RAM) 26, communication subsystem(s) 11 (the mobile device 10 may or may not include such a subsystem) and user input components 32 such as a keyboard or keypad and auxiliary on-screen navigation and selection input device(s) such as a touch screen, touch pad, directional button(s), joystick and/or scrollwheel.

Some examples of the mobile device 10 include the wireless communications subsystem(s) 11 for exchanging communications with one or more communications networks including, for example, cellular type wide area wireless networks and/or wireless local area networks. In some examples, the mobile device 10 is a two-way, electronic communications device having data and possibly also voice communication capabilities. In some examples, the mobile device 10 has the capability to exchange messages with other devices and computer systems on the Internet. Depending on the functionality provided by the mobile device 10, in various examples the mobile device may be a multiple-mode communication device configured for both data and voice communications, a smartphone, a Personal Digital Assistant (PDA), or a mobile computer system among other things. In some examples, the mobile device 10 is not a wireless communications device. For example, there exist PDAs that are not capable of sending and receiving wireless communications.

Operating system software 50 and various software applications (for example, calendar application 56, and messaging application 60) used by the microprocessor 38 are, in a number of example embodiments, stored in a persistent store such as the flash memory 24 or similar storage element. Those skilled in the art will appreciate that the operating system 50, other software applications, or parts thereof, may be temporarily loaded into a volatile store such as the RAM 26.

The microprocessor 38, in addition to its operating system functions, can enable execution of software applications (for example, the calendar application 56 and the messaging application 60) on the mobile device 10. A predetermined set of software applications which control basic device operations, including data and voice communication applications for example, will normally be installed on the mobile device 10. In some embodiments, the processor 38 is configured to implement a number of modules for interacting with the various device subsystems described above (or other device subsystems). In some embodiments, some or part of the functionality of a number of these modules can be implemented through firmware or hardware components instead of, or in combination with, computer software instructions executed by the microprocessor 38 (or other processors).

As a first module example, under instructions from the calendar application 56 resident on the mobile device 10, the processor 38 could be configured to implement calendar module 62. The calendar module 62 facilitates device user scheduling and reminding in relation to calendar events. In some examples, the calendar module 62 handles meeting invitations sent and received over a communication network, through the communication subsystem 11. Also, a database (not explicitly shown) adapted to store event data corresponding to entered event details can be maintained on the flash memory 24, the RAM 26 and/or some other computer readable medium such as a remotely located magnetic/optical-based disk drive, for example. The calendar module 62 is able to add, alter and delete event data in this database by way action queries, for example.

As a second module example, under instruction from the messaging application 60 resident on the mobile device 10, the processor 38 could be configured to implement messaging module 66. The messaging module 66 enables composition of data items, such as e-mail messages for example. Such composed items may then be transmitted over a communication network through the communication subsystem 11. Conversely, messages can be received through the communication subsystem 11 for processing by the messaging module 66.

Figure 2:
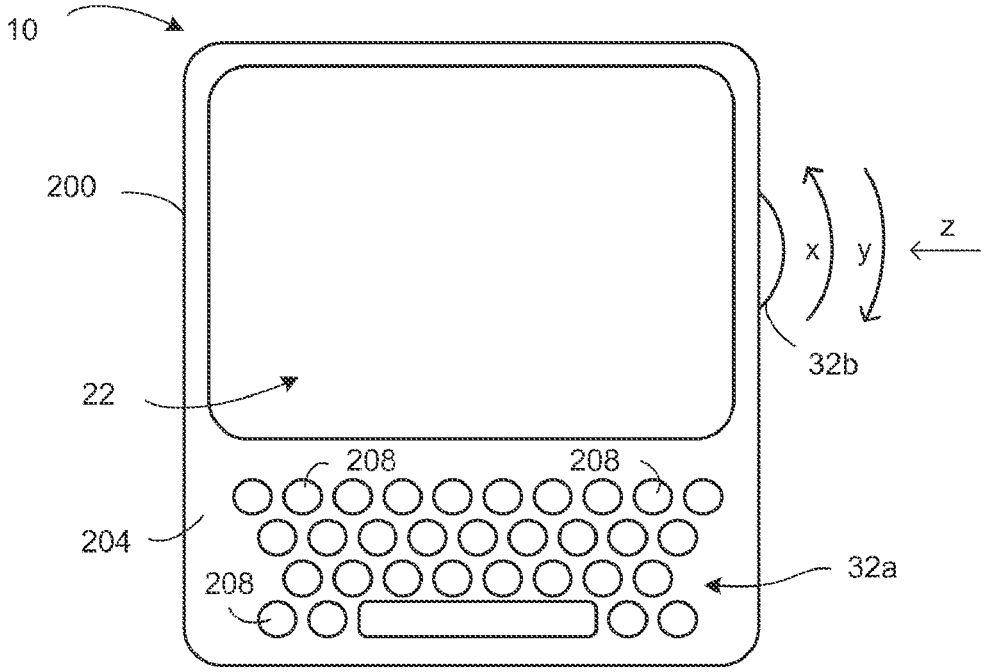
FIG. 2 is a front or plan view, in diagrammatic form, of an example of the device of FIG. 1.

With reference now to FIG. 2, in some examples, the components and subsystems of mobile device 10 are housed within a rigid case 200 that is configured to be held with one or two hands while the mobile device 10 is in use. The case 200 may be a single housing, or in some embodiments, could include parts that are pivotally or slidably connected together. The mobile device 10 is, in some examples, small enough to fit inside a standard purse or coat pocket, be clipped to a belt, and/or be mounted on a belt-worn holster. In the illustrated embodiment, alphanumeric keyboard or keypad 32a is horizontally positioned symmetrically between a left edge and a right edge of a face 204 of the mobile device 10. The keyboard 32a includes several keys 208 for user input of displayable numbers, letters or other characters.

In some examples, the keys 208 of the keyboard 32a consist of number, pound and asterisk keys typically found on any telephone, plus a few additional keys associated with miscellaneous inputs (for example, a hang up or answer call key); however in examples such as the illustrated example, the keyboard 32a has a larger number of keys. In the illustrated example, the keyboard 32a mimics standard full-sized keyboards normally associated with personal computers (e.g. a number of the keys 208 could each permit input of a particular letter of the alphabet). The illustrated keyboard 32a also includes one or more keys that can be held down to give an alternate meaning to another of the keys (or other input component) when depressed. In at least one example, these one or more keys include an Alt key. As will be appreciated by those skilled in the art, keys that give alternate meaning to other input components enable expanded input capability such as, for example, the ability to provide for so-called "shortcut keys" or "hot keys".

The illustrated mobile device 10 also includes a scrollwheel 32b that can be rotated upwards towards an upper end of the device or downwards towards a bottom end of the device, as indicated by the arrows x and y respectively. Rotation is about an axis perpendicular to the face 204 of the mobile device 10. In the illustrated example, the scrollwheel 32b protrudes through an opening that is provided through a side of the housing case 200 so as to be adapted for manipulation by a thumb (or other hand digit) of a user of the mobile device 10. In addition to being rotatable, the illustrated scrollwheel 32b can also be depressed inwardly as indicated by arrow z.

Figure 3:
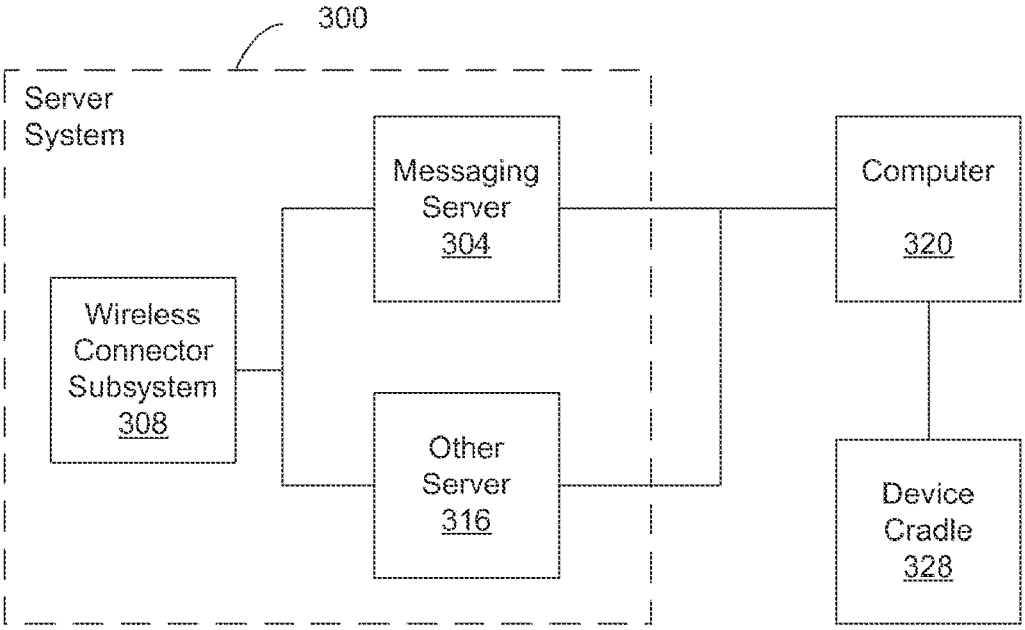
FIG. 3 shows a block diagram of an example server system that provides services to some examples of the device of FIG. 1.

FIG. 3 shows a block diagram of an example server system 300 that provides services to some examples of the mobile device 10. Typically, when a mobile device 10 is initially set-up or provisioned for a user, the device 10 will become associated with a server 300 that is part of an enterprise network that is operated by an organization with which the device user is affiliated. Within the illustrated server system 300, at least one messaging server 304, which may for example be implemented using Microsoft Exchange™ Server, IBM Lotus Domino™ Server, Novell Group Wise™ Server, or some other similar server software, is typically connected to a firewall for receiving e-mail messages from the Internet and rerouting those messages (however in at least one example the server 304 is a Personal Information Management server without messaging support capabilities). In addition to the messaging server 304 typically acting as a primary interface for the exchange of messages within a corporation (or organization) and over the Internet, the messaging server 304 also typically provides functions related to the management of data associated with calendar and task lists, for example. As will be appreciated by those skilled in the art, objects and other data received by the messaging server 304 are typically stored in a message store (not explicitly shown) for possible retrieval in the future. It will additionally be understood that, in some examples, an enterprise network will include a server system 300 having a plurality of messaging servers 304. Some of these plurality of messaging servers may be implemented using server software produced by one company (e.g. Microsoft Exchange™ Server produced by Microsoft®) while others may be implemented e using server software produced by a different company (e.g. IBM Lotus Domino™ Server produced by IBM®).

The illustrated server system 300 also includes a wireless connector server or subsystem 308. In some examples, the wireless connector subsystem 308 relays received electronic messages from a message store within the enterprise network out to a mobile device, and conversely the wireless connector subsystem 308 can also facilitate the handling of messages composed on a mobile device, which are sent to the messaging server 304 for subsequent delivery. The wireless connector subsystem 308 functions as an interface between the enterprise network (to which it belongs) and a wireless network. As will be appreciated by those skilled in the art, an enterprise network may, in some instances, include multiple wireless connector subsystems 308 such as in some implementations where a large number of mobile devices need to be supported.

The server system 300 may optionally include one or more other servers 316 enabling the server system 300 to provide other types of services to mobile devices besides those related to messages, calendar entries, etc. In some examples, the server 316 could be a collaboration server employed in conjunction with one or more other collaboration tools in relation to cooperative document revision, team rooms, discussions stored in discussion databases and the like. In other examples, the server 316 could be a type of media server enabling the server system 300 to provide services similar to those associated with so-called unified messaging systems.

A number of computers 320 (for convenience only one is shown in FIG. 3) communicate with the server system 300 over, for example, a Local Area Network (LAN). As subsequently explained, the computer 320 can be employed in provisioning of the mobile device 10. Coupled to the computer 320 is a device cradle 328 that can physically receive the mobile device 10. The cradle 328 may be coupled to the computer 320 by a serial or a universal serial bus (USB) connection, for example. Often, a computer 320 and a mobile device 10 will each be associated with a common user.

When the mobile device 10 is in the cradle 328, provisioning of the mobile device 10 can be carried out through communications with the server system 300 mediated by the computer 320. In some examples, such provisioning may change and/or add to calendar application settings 58 (FIG. 1) and it will be understood that the calendar application settings 58 may be a file(s) (or some other object or objects) loaded by the calendar application 56 when the application is launched. As will be appreciated by those skilled in the art, the calendar application settings 58 dictate the behavior of the calendar application 56.

So-called synchronization may also be carried out when the mobile device 10 is in the cradle 328. As understood by those skilled in the art, synchronization involves the mobile device and the server system 300 updating each other with respect to any new information on either device. In some examples, a database that stores event data such as calendar event data, for example, will exist on both the server system 300 and the mobile device 10; however at times the server system's database may, for instance, only be as up-to-date as the last time that synchronization was carried out, whereas the mobile device's database (calendar database 59 in FIG. 1) is fully up-to-date, or vice-versa. In at least some example embodiments, synchronizing updates of calendar event data between the calendar databases maintained on the server system 300 and the mobile device 10 is done over the air instead of or in addition to through the above described "docked" synchronization. In some embodiments, calendar event information is stored in a database at computer 320 rather than (or in addition to) on the server system 300, and the calendar databases at the computer and the mobile device 10 are periodically synchronized either through a wired connection when the device is docked in cradle 328, or through a wireless connection through the server system 300. In some embodiments, very little calendar data is stored locally at the device 10, and detailed calendar event information must be wirelessly from the server system 300 to be viewed at the mobile device 10.

Figure 4:
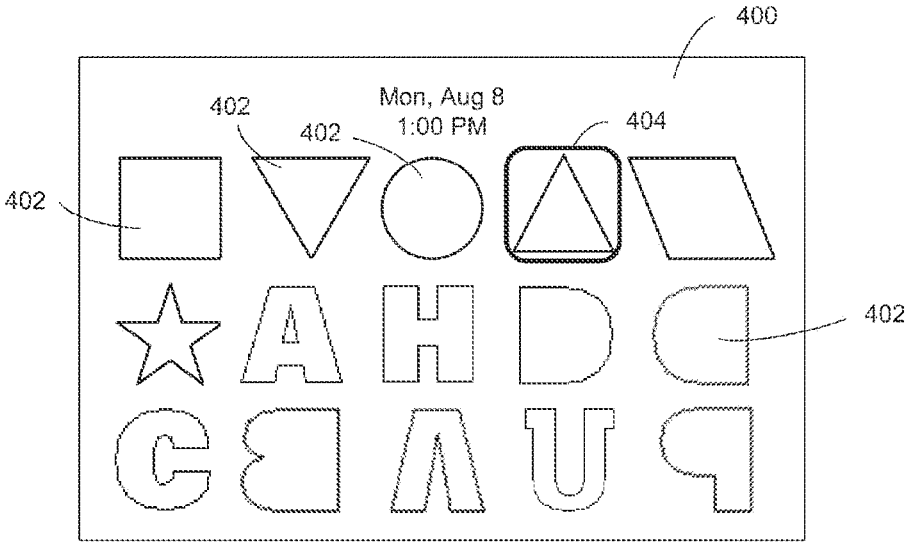
FIG. 4 shows, in diagrammatic form, an example user interface screen of an operating system within which a user of the device shown in FIG. 1 can request that an application be run.

In order that details of example embodiments may be expounded upon, a number of example user interface screens of the mobile device 10 are now described. Beginning with reference to FIG. 4, example user interface screen 400 is generated by the operating system 50 to provide the device user with choices of applications that be can run. In the illustrated example, various applications each have an associated selectable icon 402. For instance, one of the icons 402 might be associated with the calendar application 56, and another of the icons 402 might be associated with the messaging application 60. In at least one example, the device user can rotate the scrollwheel 32b in either direction x or y, causing selection symbol 404 to move through the icons 402 until it is positioned on the icon 402 associated with the application or function that the device user wants to launch. The device user can then depress the scrollwheel 32b in direction z to select the icon that is highlighted or focused by the selection symbol 404. This input action is translated by the operating system 50 into a request for the application associated with the selected icon to be launched. In at least one example, one or more alternative input components can be operated to carry out the same application launch request, for instance, pressing of a combination of arrow keys and an Enter key or pressing one or more shortcut keys.

Once the operating system 50 launches the appropriate application or function, the user interface screen 400 on display 22 may be replaced by whatever startup interface screen is generated by the launched application. The device user would then typically proceed through further user interface screens of the application that was launched. For example, if the device user launches the calendar application 56, the device user may choose to navigate through a number of user interface screens in order to enter the details of various calendar events.

Figure 5:
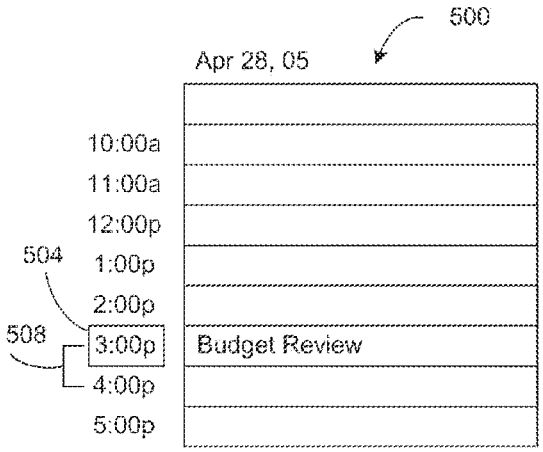
FIG. 5 shows, in diagrammatic form, an example user interface screen of a calendar module within which the device user selects a time for an event on a particular date.

An example startup interface screen 500 generated on the display 22 by the calendar application is shown in FIG. 5. Within the screen 500 is a two column table representing a calendar day, with rows in the table representing calendar entries. The left hand column lists times at intervals of one hour, and the time period being from 9:00 AM through to 5:00 PM for the date of Apr. 28, 2005 (however any suitable time intervals and time period are contemplated). The right hand column is for short subject descriptions corresponding to the respective times in the left hand column. In the illustrated example, the device user can navigate selection symbol 504 up or down the times listed in the left hand column to select a particular calendar entry. The device user can do this by, for instance, rotating the scrollwheel 32b in either direction x or y, or by means of some other input component(s) such as, for example, arrow keys on the keyboard 32a. The user may, for example, choose to navigate the selection symbol 504 down to the column entry "3:00 PM". It will be understood that a calendar event has already been entered in relation to this time because the words "Budget Review" appear in the same row in the right hand column and bracket 508 indicates that this calendar event will occur between 3:00 and 4:00 PM.

Figure 5A:
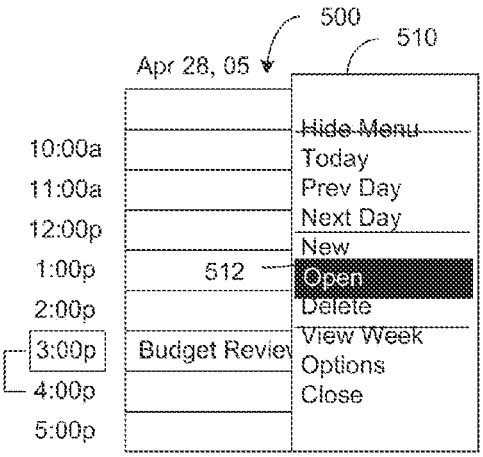
FIG. 5A shows, in diagrammatic form, an the example user interface screen of FIG. 5 after a calendar entry is selected.

When the interface screen 500 is displayed on display 500, one or more predetermined user input activities (for example depressing the scrollwheel 32b or an "Enter" key) results in an option menu 510 of selectable calendar functions being displayed on the device display 22, such as shown in FIG. 5A. In the illustrated example the option menu 510 includes selectable functions such as "hide menu"; "today", "Prev Day" and "Next Day" (for viewing the calendar screen 500 for the current day, previous day or next day, respectively); "View Week" "Options" and "Close". In the event that the scrollwheel 32a is pressed (or other predetermined user input activity occurs) when the selection symbol 504 is located at a scheduled calendar event (in this case the 3:00 pm budget review meeting), then an "Open" option and a "Delete" option are included in the option menu 510 for respectively opening and deleting the selected or highlighted calendar entry. A "New" option is also provide in the list 510 for entering a new calendar event. An option menu selection symbol 512 can be scrolled (in response to rotation of scrollwheel 32b or other navigational input) through the options in the list 510 to highlight an option for selection through subsequent depression of the scrollwheel (or other user selection activity). In the illustrated embodiment, the selection symbol 512 is highlighting the "Open" function in respect of the scheduled 3 pm "Budget Review" calendar event.

Figure 6:
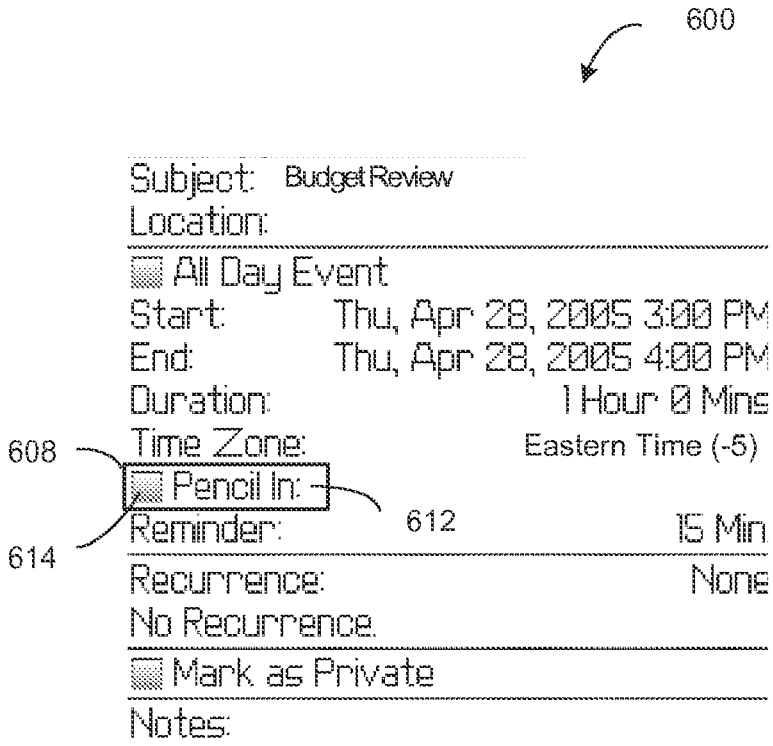
FIG. 6 shows, in diagrammatic form, another example user interface screen of the calendar module within which the device user views or enters details of the event.

Still with reference to the example event relating to a budget review, FIG. 6 shows an example calendar event detail user interface screen 600 generated subsequent to the screen 500 and in response to the device user requesting for the "Budget Review" event to be opened. As shown, the Budget Review event is scheduled to begin at a first point in time (Thursday, Apr. 28, 2005 at 3:00 PM) and end at a second point in time (Thursday, Apr. 28, 2005 at 4:00 PM). Details of the Budget Review event are displayed within the screen 600 and are also provided in Table A below:

TABLE A

| Description of Detail(s) | Event Detail(s) |
|---|---|
| Short subject description | Budget Review |
| Event start date and time | Thursday, Apr. 28, 2005 at 3:00 PM |

TABLE A-continued

| Description of Detail(s) | Event Detail(s) |
|---|---|
| Event end date and time | Thursday, Apr. 28, 2005 at 4:00 PM |
| Duration of event | One hour and zero minutes |
| Penciled or not penciled in | Not penciled in |
| Number of minutes prior to start time that reminder is to be generated | 15 minutes |
| Recurrence or no recurrence | None |
| Marked or not marked as private | Not marked as private |
| Notes | No notes entered |

It will be understood that in alternative examples calendar event details may include more or fewer details than the above example. Possible additional details may include, for example, meeting/appointment location, long meeting/appointment description, etc. In some example embodiments, the displayed calendar details may be retrieved from calendar database 59 stored locally on the mobile device 10 (as indicated above, in at least some embodiments the locally stored calendar database 59 is periodically synchronized with a corresponding calendar database maintained at server system 300 or computer 320. In some example embodiments, when the device user "opens" a calendar event for viewing at the mobile device, at least some of the displayed calendar event details are retrieved over the air from a database maintained at the server system or computer 320.

In the illustrated example of FIG. 6, selection symbol 608 can be navigated through the various calendar event details to change and/or set these details. (Again navigation can be carried out by the device user rotating the scrollwheel 32b in either direction x or y, or by means of some other input component or components such as, for example, arrow keys or a Tab key.) When the selection symbol 608 is navigated onto the detail desired to be modified or set, such modification or setting may not necessarily be effectuated immediately by depressing the scrollwheel 32b (or depressing the Enter key on the keyboard 32a) but may instead be effectuated by some series of selection list navigation(s) and/or combination of scrollwheel movements. In example embodiments, when all desired changes have been made to the information fields of interface 600, a device user can save those changes to database 59 (for eventual synchronization with the calendar database maintained at server system 300).

Figure 6A:
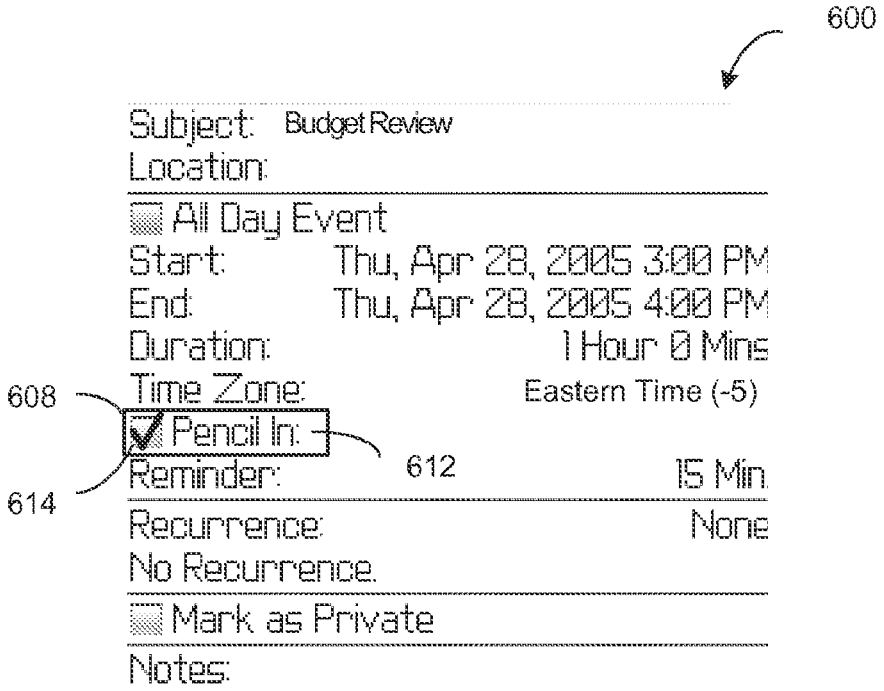
FIG. 6A shows, in diagrammatic form, the example user interface screen of the FIG. 6 with a marked busy status indicator.

The calendar event detail user interface screen 600 includes a free/busy availability status field 612 in the form of a box 614 followed by the term "Pencil In". The free/busy availability status field 612 indicates the device user availability status during the time slot for which the calendar event is scheduled. In FIG. 6, the availability status field 612 is set at free (i.e. not penciled in because there is no fill-in or check mark in box 614—FIG. 6A illustrates the availability status field 612 set at busy, as illustrated by the checkmark 614). If the device user wished to change the availability status detail shown at availability status field 612, this could be done by moving the selection symbol 608 to highlight the availability status field 612 and then carrying out the change by further input component(s) operation (for example rotating the scrollwheel 32B, possibly in combination with pressing another key). Such a change would mean that a different (than the current) availability status value would replace the existing value both on the display screen and in the stored database information. The free/busy status assigned by a device user to a calendar event may be used by the calendar application to determine how to respond to scheduling requests that compete for time slots with events that are already scheduled.

For the example of FIG. 6, the granularity of the availability status detail is only akin to "yes" (penciled in, so I'm busy) or "no" (not penciled in, so I'm free). As will be appreciated by those skilled in the art, IBM Lotus Domino™ Server is an example of a messaging server that supports the illustrated two option-type availability status. Thus, the availability status field 612 of interface screen 600 takes a form compatible with a server system 300 in which the event database-maintaining messaging server 304 is implemented using IBM Lotus Domino™ Server software (FIG. 3). The fact that the messaging server 304 that the mobile device 10 is associated with is an IBM Lotus Domino™ Server can be specified in the calendar application settings 58 upon provisioning of the mobile device 10, and the mobile device 10 configured to use an interface screen 600 with a compatible availability status field.

Figure 7:
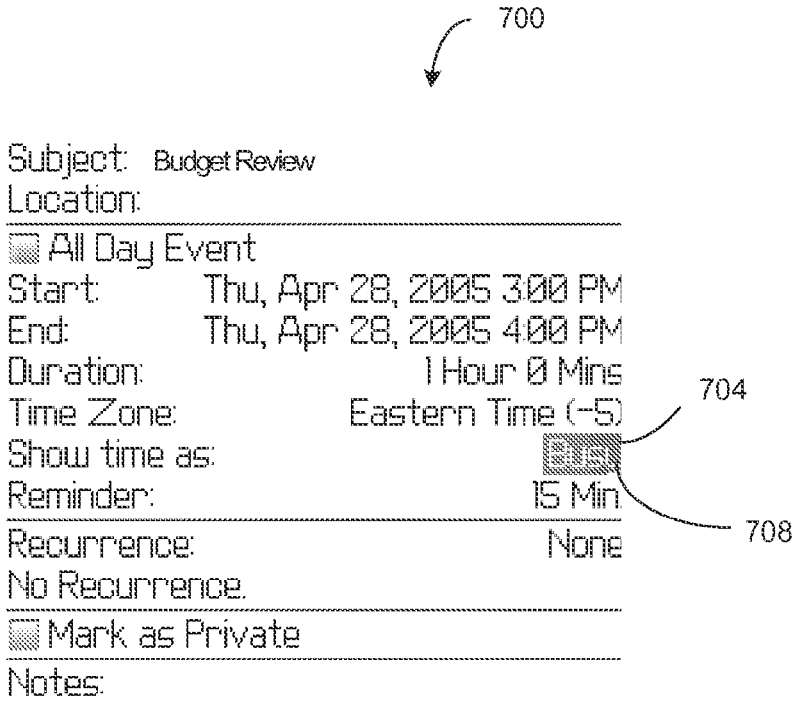
FIG. 7 shows, in diagrammatic form, an alternative example user interface screen similar to the screen shown in FIG. 6.

User interface screen 700 shown in FIG. 7 is similar to the screen 600, but differs in relation to how the availability status detail is defined and can be changed. The availability status detail is shown at a free/busy availability status field 704 and can be modified through user interaction with a selection list (such as example selection list 800 shown in FIG. 8). The selection list 800 is generated in response to a user highlighting the status availability field 704 with an on-screen selection symbol 708 (for example, by rotating scrollwheel 32b) and then providing a selection input (for example, by depressing the scrollwheel 32b).

Within the example selection list 800 are four selectable availability status options: "Free" (option 804), "Tentative" (option 806), "Busy" (option 808) and "Out of Office" (option 810). "Free" may mean that the device user can do other things during that time period if need be. "Tentative" may mean that the device user will likely be unavailable to do other things during that time period, but there could still be a chance that, for example, what he intended to do could be postponed/cancelled leaving him available during that time period. "Busy" may mean that the device user will be unavailable to do other things during the time period of the calendar event. "Out of Office" may mean that the device user will not be at work during the time period of the calendar event, and hence possibly even less likely to be reachable at that time as opposed to if he were merely "Busy". To choose one of the options 804, 806, 808 and 810 within the selection list 800, the device user can navigate a selection symbol 812 up or down as need be to highlight the desired option, and then make a selection input. The device user can move the selection symbol 812 by, for instance, rotating the scrollwheel 32b in either direction x or y, or by means of some other input component(s) such as, for example, arrow keys on the keyboard 32a. The selection input can, for example, include depression of the scrollwheel 32b or some other designated selection key.

In FIG. 7, the detail shown at availability status field 704 is set at busy (which may be a default setting). If the device user wished to change the availability status detail shown at availability status field 704, this could be done by bringing up the selection list 800 followed by input component(s) operation as previously described in order to produce the appropriate change request received the calendar module 62. Such a change would mean that a different (than the existing) availability status value would replace the existing value as displayed on the screen, and as stored in the calendar database.

Figure 8:
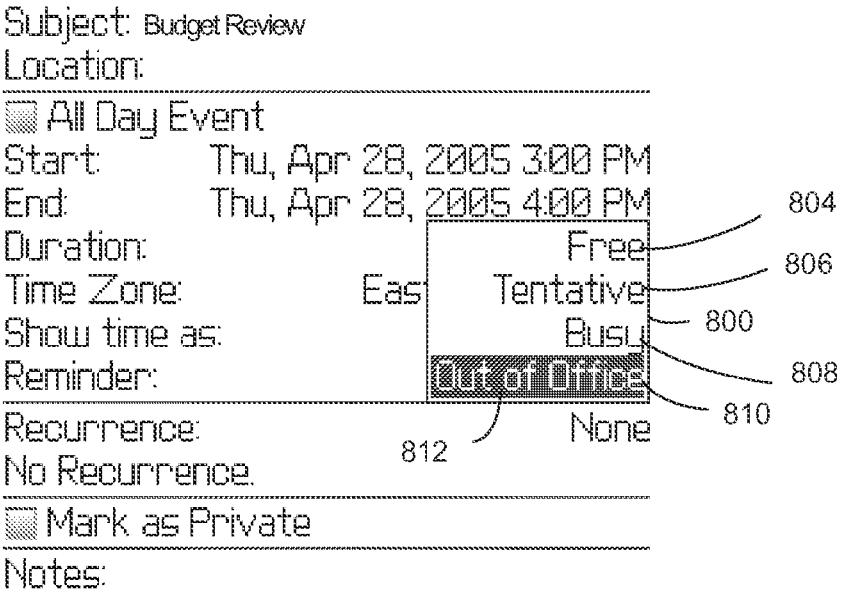
FIG. 8 shows, in diagrammatic form, the screen of FIG. 7, but additionally including a selection list listing a number of possible device user availability statuses.

It will be understood that the granularity of the availability status detail described in connection with the example of FIGS. 7 and 8 is greater than the granularity of the availability status detail of the example described in connection with FIG. 6. For the example of FIGS. 7 and 8 there is a spectrum of availabilities. At one end of the spectrum the device user is "Free", at the other end of the spectrum the device user is "Out of Office", and in the middle of the spectrum are the "Tentative" and "Busy" availability status possibilities. As will be appreciated by those skilled in the art, Microsoft Exchange™ Server is an example of a messaging server that supports the illustrated four option-type availability status. Thus, the availability status field 704 of calendar event detail interface screen 700 takes a form compatible with a server system 300 in which the event database-maintaining messaging server 304 is implemented using Microsoft Exchange™ Server software (FIG. 3). The fact that the messaging server 304 that the mobile device 10 is associated with is a Microsoft Exchange™ Server can be specified in the calendar application settings 58 upon provisioning of the mobile device 10, and the mobile device 10 configured to use an interface screen 700 with a compatible availability status field.

In at least one example embodiment, the mobile device 10, prior to being provisioned for use with a specific type of server system 300, has the ability to support a plurality of different possible calendar event detail user interface screens (for example screens 600, 700) each having a different availability status field configurations (for example fields 612, 704). Upon provisioning of a mobile device 10 to associate the device with a particular server system 300, the device settings are configured so that a default calendar event detail user interface is selected that has an availability status field that is compatible with the availability status information generally used by the particular server system 300.

Turning again to FIG. 5A, in the event that the device user selects the "New" option from option menu 510, the user will be presented with a calendar interface screen 600 or 700 (depending on device configuration), except that the display calendar event data fields will be empty or set to default values that the user can modify to schedule a new calendar event.

It will be understood that the calendar application 56 need not be a distinct application launchable by way one of the icons 402 within the screen 400 (FIG. 4) of the operating system 50: the calendar application 56 could, for example, be an integrated component of the messaging application 60. Some or all of the functionality of applications 56 and 60 could in some embodiments be incorporated into a personal information management ("PIM") application.

Certain adaptations and modifications of the described embodiments can be made. Therefore, the above discussed embodiments are considered to be illustrative and not restrictive.

The invention claimed is:

1. A method comprising:

determining, by an electronic device, a [type] *provider identity* of a remote server in communication with the electronic device*, wherein the remote server comprises a messaging server that provides calendar functions to the electronic device, and wherein the provider identity of the remote server is specified in calendar application settings of the electronic device*; [and setting,] *selecting,* by the electronic device, *from a plurality of different sets, a set of a plurality of* availability status options for an availability status field [for calendar events] based on the [type] *provider identity* of the remote server*; and*

*generating, by the electronic device, a calendar application user interface for creating or modifying calendar events on a display of the electronic device, wherein the calendar application user interface includes the availability status field, and wherein each one of the plurality of availability status options is selectable from the availability status field.*

2. The method of claim 1, further comprising:

exchanging with the remote server calendar event data for scheduled calendar events, *wherein* the calendar event data [including the] *includes an* availability status of the scheduled *calendar* events.

[3. The method of claim 1, wherein setting the availability status options is based on whether the remote server is a server that identifies itself as being implemented using IBM Lotus Domino™ or a server that identifies itself as being implemented using Microsoft Exchange™ Server.]

4. The method of claim 1, [wherein setting comprises setting availability status options for the availability status field of a calendar events detail user interface screen of a calendar application,] wherein the calendar [events detail] *application* user interface [screen displays] *includes* details about an event.

5. The method of claim 1, wherein [setting the availability status options] *the plurality of different sets* comprises:

[causing the availability status field to have] *a first set of* at least two availability status options *that is selected* when the [remote server is a first type of server] *provider identity of the remote server is a first provider identity*; and

[causing the availability status field to have] *a second set of* at least four availability status options *that is selected* when the [remote server is a second type of server] *provider identity of the remote server is a second provider identity, and*

*wherein the first set has less availability status options than the second set.*

6. The method of claim 5, wherein the at least two availability status options [when the remote server is the first type of server] include a "Free" status and *a* "Busy" status["], *and* wherein the at least four availability status [levels when the remote server is the second type of server] *options* include a "Free" status, *a* "Tentative" status, *a* "Busy" status, and *an* "Out of Office" status.

[7. The method of claim 1, further comprising:

displaying a calendar events detail user interface screen that includes a plurality of fields specifying information about an event, wherein one of the fields in the plurality of fields is an availability status field for displaying an availability status associated with the event.]

8. The method of claim 1, wherein [setting the availability status options] *selecting the set* is performed during communication between the electronic device and the remote server.

9. The method of claim 1, wherein [setting the availability status options] *selecting the set* is performed during provisioning of the electronic device or synchronization of the electronic device with the remote server.

10. An electronic device[,] comprising: *a display;* a controller; *and* a communication subsystem, coupled to the controller, which exchanges calendar event data with a remote server[;], *wherein* the controller [being] *is* configured to*:* determine a [type] *provider identity* of the remote server [and ]*, wherein the remote server comprises a messaging server that provides calendar functions to the electronic device, and wherein the provider identity of*

*the remote server is specified in calendar application settings of the electronic device;*

[set] *select, from a plurality of different sets, a set of a plurality of* availability status options for an availability status field [for calendar events] based on the [type] *provider identity* of the remote server*; and*

*generate a calendar application user interface for creating or modifying calendar events on the display, wherein the calendar application user interface includes the availability status field, and wherein each one of the plurality of availability status options is selectable from the availability status field.*

11. The electronic device of claim 10, wherein the controller is configured to cause the communication subsystem to exchange calendar event data for scheduled calendar events, *and wherein* the calendar event data [including the] *includes an* availability status of the scheduled *calendar* events.

[12. The electronic device of claim 10, wherein the controller is configured to set the availability status options based on whether the remote server is a server that identifies itself as being implemented using IBM Lotus Domino™ or a server that identifies itself as being implemented using Microsoft Exchange™ Server.]

13. The electronic device of claim 10, [wherein setting comprises setting availability status options for the availability status field of a calendar events detail user interface screen of a calendar application,] wherein the calendar [events detail] *application* user interface [screen displays] *includes* details about an event.

14. The electronic device of claim 10, wherein the [controller is configured to] *plurality of different sets comprises:*

[cause the availability status field to have] *a first set of* at least two availability status options *that is selected* when the [remote server is a first type of server,] *provider identity of the remote server is a first provider identity;* and

[cause the availability status field to have] *a second set of* at least four availability status options *that is selected* when the [remote server is a second type of server] *provider identity of the remote server is a second provider identity, and*

*wherein the first set has less availability status options than the second set.*

15. The electronic device of claim 14, wherein the at least two availability status options [when the remote server is the first type of server] include a "Free" status and *a* "Busy" status["], *and* wherein the at least four availability status [levels when the remote server is the second type of server] *options* include a "Free" status, *a* "Tentative" status, *a* "Busy" status, and *an* "Out of Office" status.

[16. The electronic device of claim 10, further comprising:

a display coupled to the controller;

wherein the controller being is configured to generate on the display a calendar events detail user interface screen that includes a plurality of fields specifying information about an event, wherein one of the fields in the plurality of fields is an availability status field for displaying an availability status associated with the event.]

17. The electronic device of claim 10, wherein [setting the availability status options is performed] *the controller is configured to select the set* during communication between the electronic device and the remote server.

18. The electronic device of claim 10, wherein [setting the availability status options is performed] *the controller is configured to select the set* during provisioning of the electronic device or synchronization of the electronic device with the remote server.

19. A method comprising:

[determining, by] *associating* an electronic device[, a type of] *with* a remote server in communication with the electronic device*, wherein the remote server comprises a messaging server that provides calendar functions to the electronic device*;

*determining, by the electronic device, a provider identity of the remote server, wherein the provider identity of the remote server is specified in calendar application settings of the electronic device;*

[setting,] *selecting,* by the electronic device, *from a plurality of different sets, a set of a plurality of* availability status options for an availability status field [for calendar events] based on the [type] *provider identity* of the remote server;

displaying, by the electronic device, a calendar events detail user interface screen that includes a plurality of fields specifying information about an event, wherein one of the fields in the plurality of fields is [an] *the* availability status field[for displaying an availability status associated with the event]*, and wherein each one of the plurality of availability status options is selectable from the availability status field*; and setting, by the electronic device, [the] *an* availability status in the [displayed] availability status field to one of the *plurality of* availability status options in response to input received by the electronic device.

20. The method of claim 19, wherein the [controller is configured to] *plurality of different sets comprises:*

[cause the availability status field to have] a first set of availability status options *that is selected* when the [remote server is a first type of messaging server,] *provider identity of the remote server is a first provider identity;* and

[cause the availability status field to have] a second set of availability status options *that is selected* when the [remote server is a second type of messaging server] *provider identity of the remote server is a second provider identity,*

*wherein each one of the first and second sets includes at least two availability status options, and wherein the first set has less availability status options than the second set.*

*21. The method of claim 19, wherein the plurality of different sets comprises:*

*a first set of at least two availability status options that is selected when the provider identity of the remote server is a first provider identity; and*

*a second set of at least four availability status options that is selected when the provider identity of the remote server is a second provider identity, and*

*wherein the first set has less availability status options than the second set.*

*22. A non-transitory computer readable medium storing instructions to cause one or more processors to perform operations comprising:*

*determining a provider identity of a remote server, wherein the remote server comprises a messaging server that provides calendar functions to an electronic device, and wherein the provider identity of the remote server is specified in calendar application settings of the electronic device;*

*selecting, from a plurality of different sets, a set of a plurality of availability status options for an availability status field based on the provider identity of the remote server; and*

*generating a calendar application user interface for creating or modifying calendar events on a display of the electronic device, wherein the calendar application user interface includes the availability status field, and wherein each one of the plurality of availability status options is selectable from the availability status field.*

*23. The computer readable medium of claim 22, wherein the instructions further cause the one or more processors to perform an operation comprising exchanging calendar event data for scheduled calendar events, the calendar event data includes an availability status of the scheduled calendar events.*

*24. The computer readable medium of claim 22, wherein the calendar application user interface includes details about an event.*

*25. The computer readable medium of claim 22, wherein the plurality of different sets comprises:*

*a first set of at least two availability status options that is selected when the provider identity of the remote server is a first provider identity; and*

*a second set of at least four availability status options that is selected when the provider identity of the remote server is a second provider identity, and*

*wherein the first set has less availability status options than the second set.*

*26. The computer readable medium of claim 25, wherein the at least two availability status options include a "Free" status and a "Busy" status, and wherein the at least four availability status options include a "Free" status, a "Tentative" status, a "Busy" status, and an "Out of Office" status.*

*27. The computer readable medium of claim 22, wherein the instructions further cause the one or more processors to perform an operation comprising displaying a calendar events detail user interface screen that includes a plurality of fields specifying information about an event, wherein one of the fields in the plurality of fields is an availability status field for displaying an availability status associated with the event.*

*28. The computer readable medium of claim 22, wherein selecting the set is performed during communication between the electronic device and the remote server.*

*29. The computer readable medium of claim 22, wherein selecting the set is performed during provisioning of the electronic device.*

* * * * *